(12) United States Patent
Daniels, Jr.

(10) Patent No.: US 6,609,399 B1
(45) Date of Patent: Aug. 26, 2003

(54) CABLE LOCK

(75) Inventor: E. Kent Daniels, Jr., Shaker Heights, OH (US)

(73) Assignee: Winner International Royalty LLC, Sharon, PA (US)

( * ) Notice: Subject to any disclaimer, the term of this patent is extended or adjusted under 35 U.S.C. 154(b) by 0 days.

(21) Appl. No.: 09/467,491

(22) Filed: Dec. 20, 1999

(51) Int. Cl.⁷ .............................................. E05B 67/06
(52) U.S. Cl. .................... 70/49; 70/233; 70/30; 70/14
(58) Field of Search .................. 70/30–49, 233, 70/19, 14–18, DIG. 9; 24/20 TT, 16 R

(56) References Cited

U.S. PATENT DOCUMENTS

| | | |
|---|---|---|
| 351,063 A | 10/1886 | McCormick |
| 1,380,719 A | 6/1921 | Johnson |
| 1,384,561 A | 7/1921 | Hampton |
| 1,475,256 A | 11/1923 | Belair |
| 2,190,661 A | 2/1940 | Hauer |
| 3,696,647 A | 10/1972 | Balicki |
| 3,875,771 A | 4/1975 | Reisner |
| 3,906,758 A * | 9/1975 | Hurwitt .......................... 70/30 |
| 3,933,015 A | 1/1976 | Balicki |
| 4,028,916 A * | 6/1977 | Pender .......................... 70/233 |
| 5,517,835 A | 5/1996 | Smith |
| 5,791,170 A | 8/1998 | Officer |
| 5,829,280 A * | 11/1998 | Chen ............................ 70/49 |
| 5,889,463 A * | 3/1999 | Judd et al. ................... 340/427 |
| 5,992,187 A * | 11/1999 | Derman ........................ 70/58 |
| 6,227,016 B1 * | 5/2001 | Yu ............................... 70/30 |

FOREIGN PATENT DOCUMENTS

| | | |
|---|---|---|
| AU | 587718 | 8/1989 |
| GB | 1524541 | 9/1978 |

* cited by examiner

*Primary Examiner*—Anthony Knight
*Assistant Examiner*—John B. Walsh
(74) *Attorney, Agent, or Firm*—Rankin, Hill, Porter & Clark LLP

(57) ABSTRACT

A cable lock comprising a housing, a cable anchored to the housing, and a cable passageway through the housing for receiving the free end of the cable includes a cable clamping member and a key operated cam assembly which the lock is selectively operable for introducing the free end of the cable into either of the opposite ends of the cable passageway, for enabling displacement of the free end only in the direction of introduction through the passageway, for precluding displacement of the cable in either of the opposite directions in the passageway, and for releasing the cable for movement freely in both of the opposite directions. The mounted end of the cable is pivotally displaceable between positions in which the mounting end extends toward the side of the housing on which the selected entrance end of the passageway is located.

46 Claims, 7 Drawing Sheets

CABLE LOCK

BACKGROUND OF THE INVENTION

This invention relates to the art of cable locks and, more particularly, to improvements by which such locks are more versatile and easy to use.

Cable locks are of course well known and, generally, include a housing to which one end of a flexible cable is anchored and which housing includes a passageway therethrough for receiving the free end of the cable which is releasably clamped in the passageway to provide a loop with the housing. Such cable clamps serve a variety of purposes such as, for example, bundling a number of items together, interconnecting the wheel of a motorcycle or bicycle with a portion of the frame thereof, or with a bicycle rack, so as to preclude theft of the motorcycle or bicycle. The free end of the cable can be pulled through the housing passageway to the extent necessary to reduce the size of the loop to obtain a desired constrictive relationship with respect to the items engaged therein, and a key-operated mechanism is operable to lock the free end of the cable in place and to release the cable to facilitate removal of the device from the items therein. Cable locks of the foregoing character are illustrated, for example, in U.S. Pat. Nos. 2,190,661 to Hauer, 5,791,170 to Officer, British patent 1,524,541 and Australian patent 587,718, the disclosures of which patents are hereby incorporated herein by reference for purposes of background information. Of advantage in connection with the cable locks shown in the foregoing patents is the fact that the cable can be advanced through the passageway during assembly of the lock and released without the cable being withdrawn from the passageway in that a toothed finger pivotally mounted in the passageway allows movement of the cable in the direction to close or reduce the size of the cable loop while precluding displacement of the cable in the direction of retraction other than through the use of a key operated release mechanism. Thus, if a user needs to change hands or his or her position in connection with use of the cable lock, the cable can be initially introduced into the passageway through the housing and such changing of hands or shifting of position can take place without the cable lock coming open.

The cable locks disclosed in the foregoing patents, and other cable locks heretofore available of the character to which the present invention pertains, have a number of disadvantages which limit the versatility thereof as well as the ease with which the locks can be manipulated during use in connection with introducing the free end of the cable through the housing passageway therefor. More particularly in this respect, the free end of the cable in those locks having restraint against withdrawal during assembly of the cable locks can be introduced into the passageway in the housing in one direction only, and this limitation requires a user to take the time to be sure that the free end of the cable is introduced into the appropriate end of the cable passageway. Otherwise, the cable either won't enter the passageway, or enters the passageway without any restraint against retraction therefrom. In this respect, it would be possible in the device disclosed in the patent to Officer and in the first. embodiment of the British patent to introduce the free end of the cable into the passageway with the device in the unlocked condition but, in each instance, there is no restraint against retraction of the cable from the passageway should the user let go of the cable. Moreover, if the free end of the cable is introduced into the wrong end of the passageway in the device disclosed in the patent to Officer, with the clamping device unlocked, manipulation of the clamping device in the housing would render the device inoperable in that the one-way clutch or finger would allow the cable to be withdrawn from the passageway but would not allow the cable to be displaced in the direction necessary to reduce the size of the loop in connection with mounting the cable lock about items to be retained therein. In the first embodiment of the device disclosed in the British patent, the clamping arrangement in the housing either engages the cable against displacement in either direction or releases the cable for free displacement in either direction, and there is no holding finger in connection with this embodiment which provides for the one-way only displacement of the free end during assembly of the cable lock about items to be enclosed in the look thereof.

Furthermore, while it is advantageous as pointed out hereinabove to engage the free end of the cable against retraction from the passageway during assembly of the cable lock, the ability to continuiously displace the free end of the cable in the direction to reduce the size of the loop can be a disadvantage in those situations where the user does not want the loop the be overly constricted about the items therein. While the user can initially set the size of the loop in this respect, the loop can be unintentionally or intentionally further reduced in size by a third party not knowing of the user's intentions. While this can be avoided in the devices disclosed in the patent to Officer and in the first embodiment of the British patent, the free end of the cable can only be introduced in one direction through the passageway in Officer, and there is no restraint against retraction of the free end of the cable from the passageway in the British patent. A further disadvantage attendant to cable locks heretofore available resides in the fact that the fixed end of the cable is generally rigidly fastened to the housing or has limited displacement relative thereto and is oriented relative to the passageway, dimensionally and/or directionally, so as to preclude optimizing the orientation of the anchored end and the free end relative to the housing for obtaining a loop of given size with a minimal length of cable between the anchored end and the entrance to the cable passageway through the housing.

SUMMARY OF THE INVENTION

In accordance with the present invention, a cable lock is provided which advantageously minimizes or overcomes the foregoing disadvantages of such locks heretofore available. More particularly in this respect, a cable lock in accordance with the present invention provides for the free end of the cable to be selectively introduced into either of the opposite ends of the cable passageway through the housing and to be restrained against separation from the housing during the assembly of the lock about an object or objects to be captured in the loop thereof. Accordingly, a user merely needs to grasp the free end of the cable and introduce it into either end of the passageway without having to make sure that the end chosen is appropriate. Accordingly, assembly is easier and potentially less time consuming while retaining the advantage of precluding separation of the leading end from the housing during the assembly operation. Further in accordance with the invention, the anchored end of the cable is pivotally mounted on the housing for displacement to positions relative to opposite sides of the housing in which the anchored end is parallel to the cable passageway through the housing, whereby a minimum length of cable is used in connection with mounting the lock about an article or articles to be captured in the loop. Preferably, the free end of the cable extending through the passageway is adapted to be selectively clamped against displacement in either direction following assembly, whereby a loop of predetermined size can be maintained throughout a given period of use of the lock. In accordance with another aspect of the invention, a key operated cam member is operable to displace a cable clamping member in the housing selectively between a plurality of positions which provide for restraining the retraction the free end from the chosen entrance end of the passageway, locking the cable against displacement in either direction in the passageway, and releasing the cable for free displacement in either direction in the passageway. Accordingly, the cable lock is extremely versatile with respect to options of assembly available to a user, is extremely easy to manipulate with respect to the available options and, accordingly, minimizes the time and effort on the part of the user to assembly the lock with respect to articles to be enclosed in the loop. Further, a cable lock according to the invention optimizes use of the cable between the anchored end and the portion thereof extending through the cable passageway so as to minimize the length of cable necessary to obtain a loop of desired size.

It is accordingly an outstanding object of the present invention to provide a cable lock which is more versatile and easier to use than cable locks heretofore available.

Another object is the provision of a cable lock of the foregoing character in which the free end of the cable can be selectively introduced into either of the opposite ends of a cable passageway through the housing of the lock and engaged against retraction from the selected end during an assembly operation.

Yet another object is the provision of a cable lock of the foregoing character in which the free end of the cable in the passageway can be clamped against displacement in either of the opposite directions in the passageway and can be released for free displacement in both directions.

A further object is the provision of a cable lock of the foregoing character in which the anchored end of the cable is displaceable relative to the housing so as to optimize the use of cable between the anchored end and the free end in connection with forming a loop during assembly of the lock about objects to be captured in the loop.

Still a further object is the provision of a cable lock of the foregoing character in which a key operated cam and cable clamping member are interrelated for selective operation to provide one direction only displacement of the free end of the cable following the selective introduction of the free end into either one of the opposite ends of the cable passageway, to enable clamping of the cable in the passageway against displacement in either of the opposite directions therealong, and to release the cable for free displacement in either of the opposite directions.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which.

DESCRIPTION OF A PREFERRED EMBODIMENT

Figure 4:
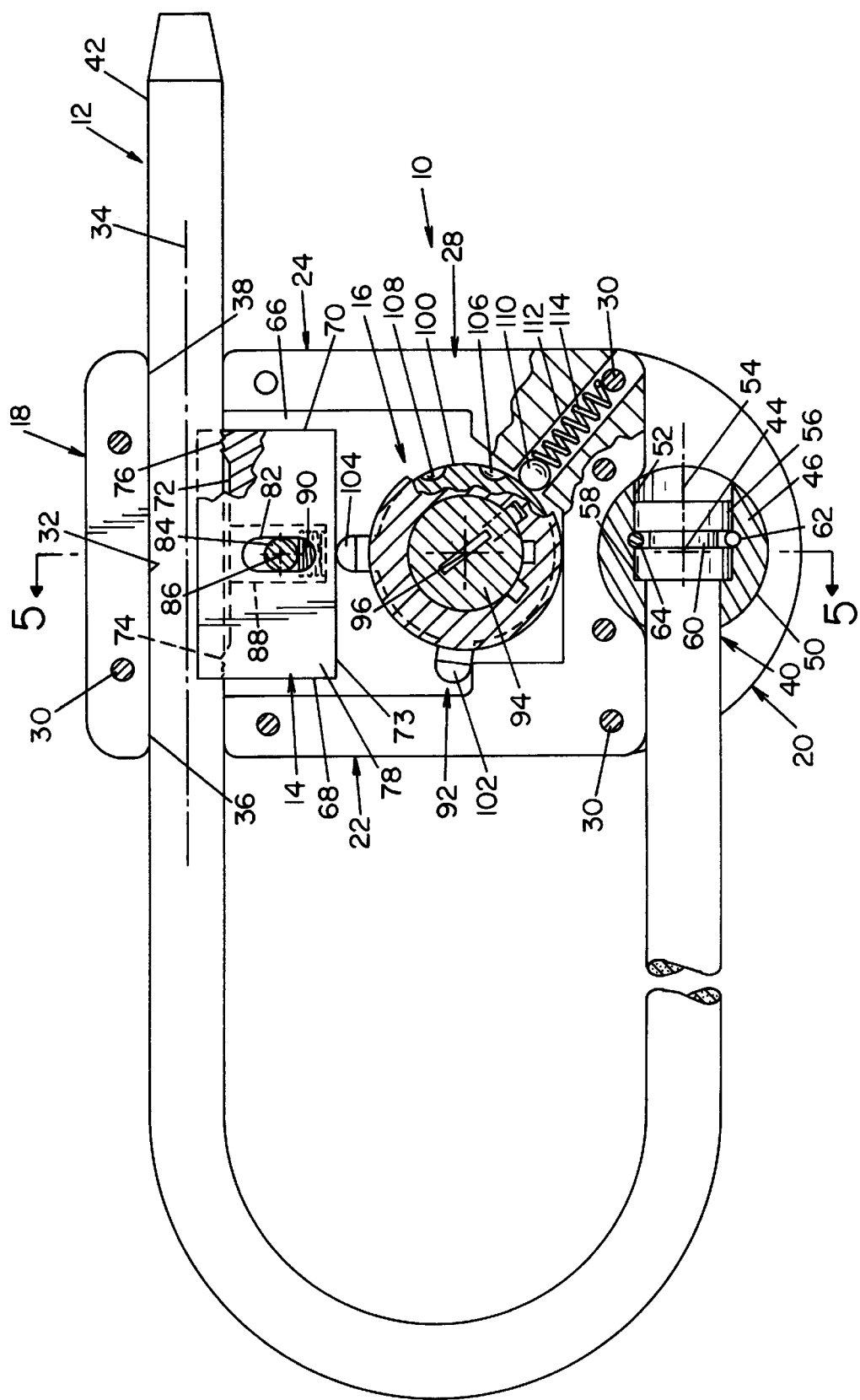
FIG. 4 is a plan view similar to FIG. 3 and showing the cam operated clamping member in the position to preclude displacement of the free end of the cable in either direction along the passageway.
Figure 5:
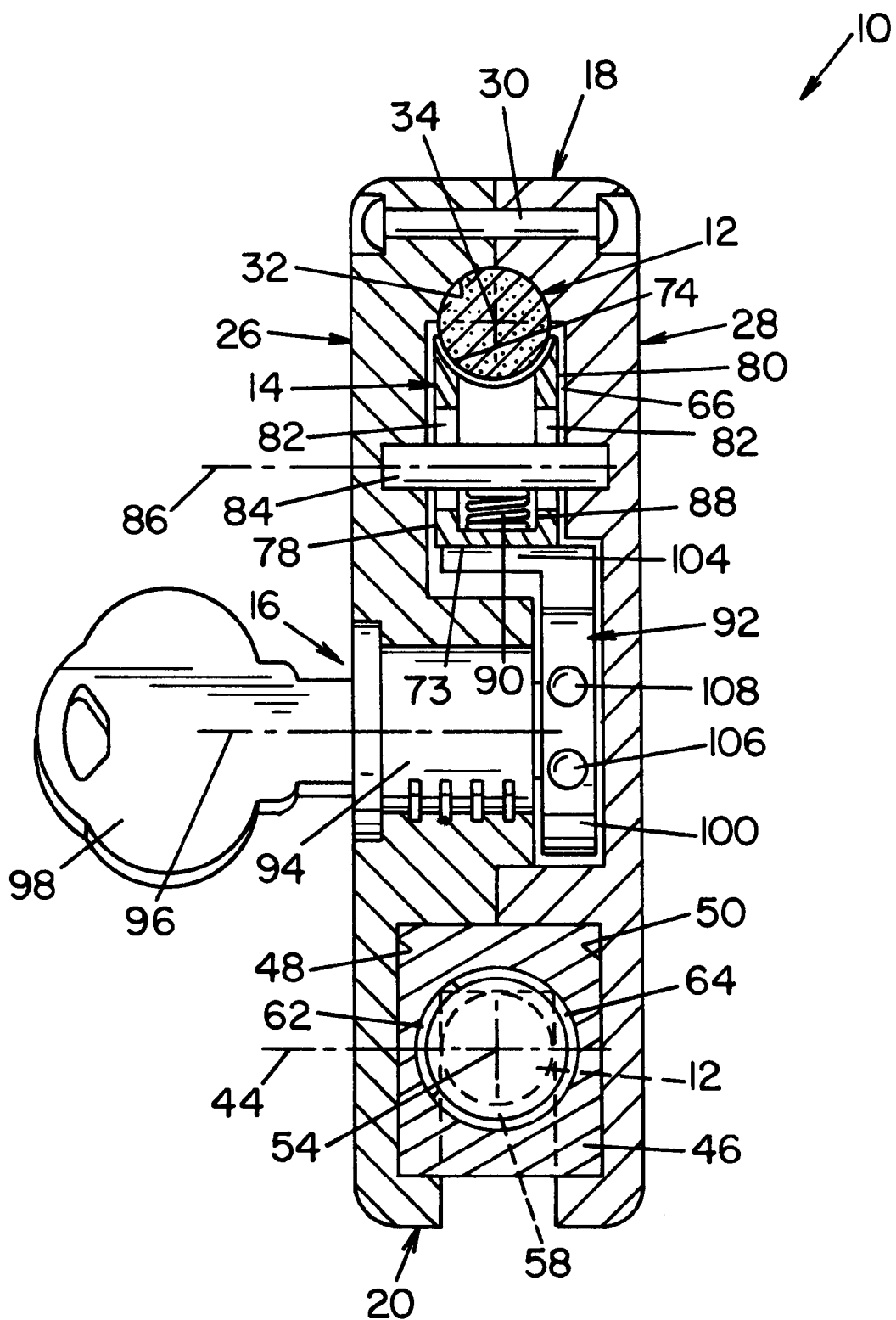
FIG. 5 is a cross-sectional view of the lock taken along line 5—5 in FIG. 4.

Referring now in greater detail to the drawings, wherein the showings are for the purpose of illustrating a preferred embodiment of the invention only and not for the purpose of limiting the invention, a cable lock in accordance with the invention comprises a housing 10, a flexible cable 12, a cable clamping member 14 and a key operated cam assembly 16. Housing 10 has a front end 18, a rear end 20 and laterally opposite sides 22 and 24 and comprises a pair of housing members 26 and 28 interconnected about the periphery of the housing by a plurality of fasteners such as rivets 30. The front end of housing 10 is provided with a cable passageway 32 having an axis 34 and having axially opposite ends 36 and 38 respectively at sides 22 and 24 of the housing. Flexible cable 12 can be of braided steel, stranded steel or the like and has a first end 40 anchored to housing 10 at rear end 20 thereof and a free end 42 adapted to be introduced into and engaged in passageway 32 as explained in greater detail hereinafter. End 40 of cable 12 is mounted on housing 10 for pivotal displacement in opposite directions about a vertical axis 44 which is laterally spaced from and transverse to axis 34 of passageway 32. As best seen in FIGS. 4 and 5, axis 44 is the axis of a cylindrical plug member 46 on rear end 20 of the housing and having its axially opposite ends supported in cylindrical recesses 48 and 50 in housing members 26 and 28, respectively. Plug 46 is provided with a stepped bore 52 extending therethrough and having an axis 54 transverse to pivot axis 44, and end 40 of cable 12 includes a terminal end in bore 52 provided with an enlarged ferrule 56 adapted to engage against a shoulder 58 in bore 52 to position end 40 in the anchoring plug. Ferrule 56 is provided with an annular recess 60 and bore 52 is provided with an annular recess 62, and recesses 60 and 62 cooperatively receive a split retaining ring 64 which releasably holds end 40 of the cable in plug 46. The retaining ring advantageously enables separation of the cable from the anchoring plug in the direction from left to right in FIG. 4 to facilitate replacement of the cable with another cable of different length or of different structure, or replacement of the cable for maintenance purposes.

Figure 1:
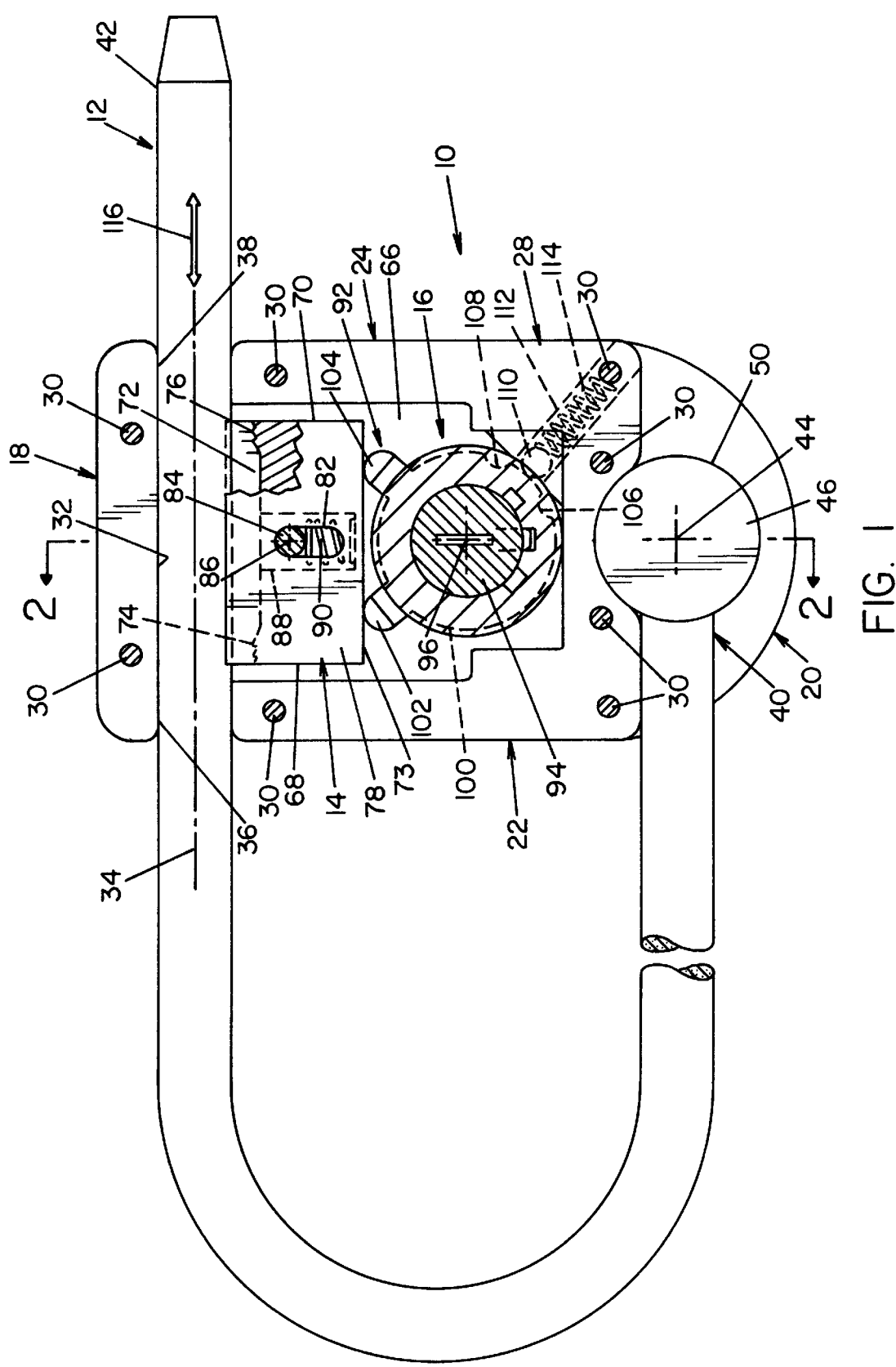
FIG. 1 is a plan view of a cable lock in accordance with the invention with the upper portion of the housing removed.
Figure 2:
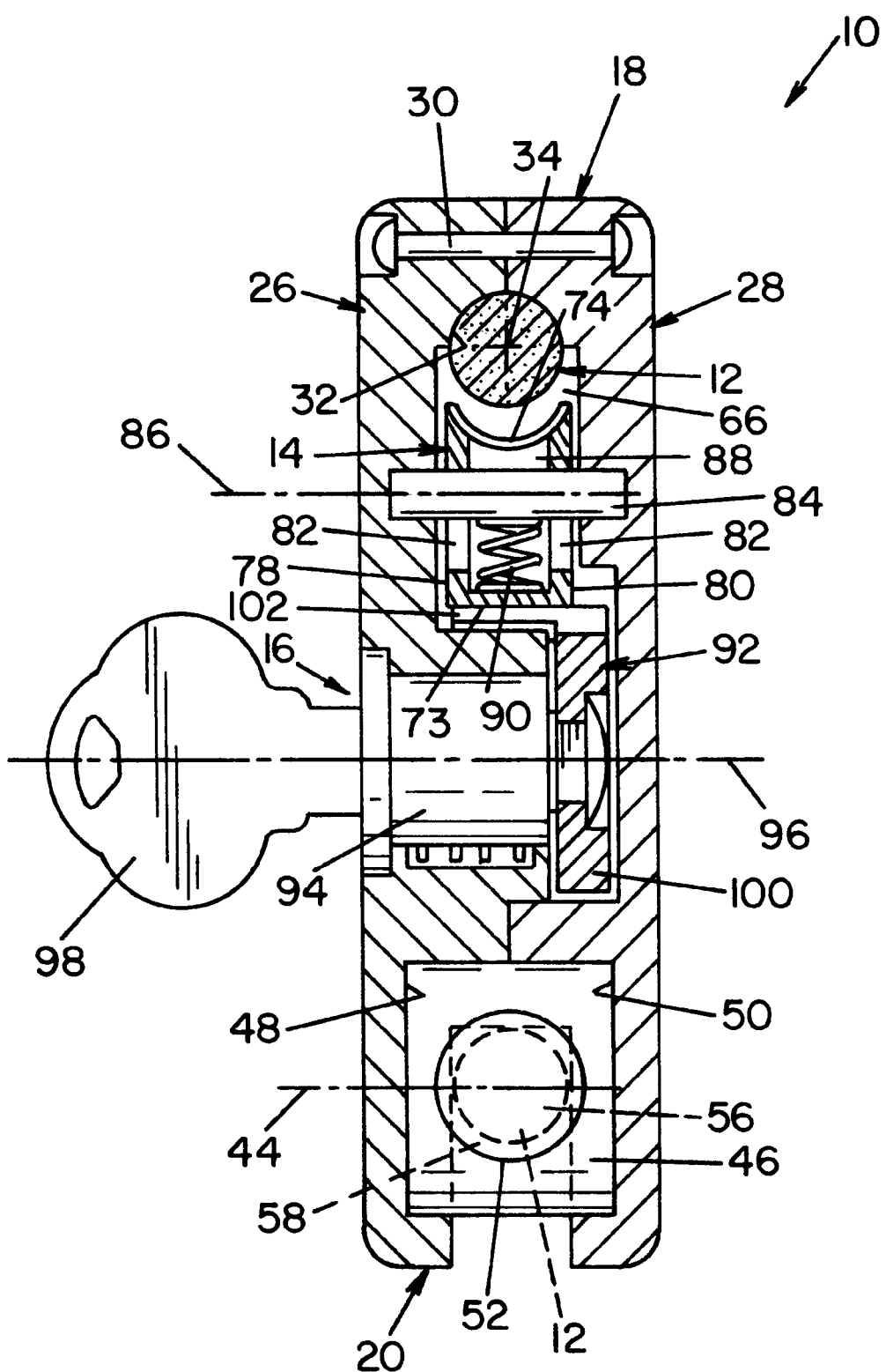
FIG. 2 is a cross-sectional view of the lock taken along line 2—2 in FIG. 1.

Referring again to FIGS. 1 and 2, cable clamping member. 14 is received in a recess 66 between housing member 26 and 28 and is in the form of a rectangular block having opposite ends 68 and 70 spaced apart in the direction of axis 34, a front end including an arcuate cable receiving recess 72 and a rear end face 73. Recess 72 faces cable passageway 32 and extends between ends 68 and 70, and the end of recess 72 adjacent end 68 is provided with cable engaging projections or teeth 74 and the end of recess 72 adjacent end 70 of the clamping member is provided with cable engaging projections or teeth 76. Clamping member 14 is supported in recess 66 for reciprocating displacement toward and away from cable passage 32 and cable 12 therein and for pivotal displacement of ends 68 and 70 and thus teeth 74 and 76 toward and away from passageway 32 and the cable. More particularly in this respect, clamping member 14 has opposite sides 78 and 80 and is provided with a slot 82 therebetween which is elongated in the direction transverse to axis 34 of the cable passageway. A post 84 extends through slot 82 and has its opposite ends secured in recesses in housing members 26 and 28, not designated numerically, and the axis 86 of post 84 provides a pivot axis for clamping member 14 as will become apparent hereinafter. Clamping member 14 is further provided with a pocket 88, and a compression spring 90 is provided in the pocket behind post 84 relative to cable passageway 32 and biases the clamping member to a fully released position as shown in FIGS. 1 and 2 and in which teeth 74 and 76 at opposite ends of the clamping member are spaced laterally inwardly of the cable passageway to disengage the portion of cable 12 in the passageway.

Key operated cam assembly 16 comprises a cam member 92 mounted on the inner end of a key operated tumbler 94 for rotation therewith about a cam axis 96 when an appropriate key 98 is introduced into the number to release the latter for rotation. Cam axis 96 is between and in a common plane with axes 44 and 86 and which plane is transverse to axis 34 of passageway 32. Cam member 92 includes a cam plate 100 extending transverse to axis 96 and having a pair of cam fingers 102 and 104 circumferentially spaced apart therealong and extending therefrom parallel to axis 96 so as to be positioned behind and in engagement with inner side 73 of the clamping member and, in the released position of the clamping member shown in FIG. 1, fingers 102 and 104 are on opposite sides and equally spaced from the plane through post axis 86 and cam axis 96. Preferably, the cam assembly is provided with a detent arrangement for releasably holding the cam member and thus clamping member 14 in certain positions thereof. As best seen in FIGS. 4 and 5, the detent arrangement in the preferred embodiment comprises a pair of circumferentially spaced apart recesses 106 and 108 in the outer periphery of cam plate 100, and a detent ball 110 at the inner end of a bore 112 in housing member 28. Ball 110 is biased against the outer periphery of cam plate 100 by a biasing spring 114 in passageway 112 between the ball and one of the housing rivets 30.

In accordance with one aspect of the invention, free end 42 of cable 12 is adapted to be selectively introduced into cable passageway 32 from either one of the opposite ends 36 and 38 thereof, and locking member 14 is selectively operable through key operated cam assembly 16 to enable displacement of the free end of the cable in the direction of entrance and against unintended displacement in the opposite direction from the direction of entrance, to preclude unintended displacement in either of the opposite directions relative to the passageway, and to enable intentional displacement freely in both directions. Selective operation of the cable lock in this respect is illustrated in the drawings as follows. FIGS. 1 and 2 illustrate the component parts in the released positions thereof in which teeth 74 and 76 of recess 72 disengage the cable and, thus, enable displacement of free end 42 of cable 12 into cable passageway 32 from either of the opposite ends 36 and 38 thereof and enable for displacement of end 42 freely in either of the opposite directions relative to the passageway as indicated by arrow 116. In this position, as mentioned hereinabove, cam fingers 102 and 104 are on opposite sides and equally spaced from a plane through post axis 86 and cam axis 96 and spring 90 biases inner end 73 of clamping member 14 against the cam fingers. Further, it will be noted that ball detent 110 is circumferentially between detent recesses 106 and 108. By turning the key operated tumbler and thus cam member 92 counterclockwise from the position shown in FIG. 1 to the position shown in FIG. 3, cam finger 102 moves away from clamping member 14 and cam finger 104 engages inner end 73 thereof to pivot the clamping member counterclockwise about post axis 86 so as to bring teeth 76 of the clamping member into radial engagement with the cable in passageway 32. Thus, as shown by arrow 118 in FIG. 3, the free end of the cable is adapted to be introduced into end 36 of passageway 32 and through the passageway to the extent desired in that the pivotal and reciprocable mounting of clamping member 14 will allow the cable to move past teeth 76 by pivoting the block about finger 104 against the bias of spring 90. At the same time, teeth 76 engage the cable in passageway 32 against displacement in the direction opposite arrow 118 or the direction of retraction with respect to the passageway. In this position of the component parts, detent ball 110 engages in recess 106 to stabilize the cam assembly against inadvertent rotation thereof as the cable is being advanced through the passageway. As will be appreciated from FIGS. 4 and 5, further rotating cam member 92 counterclockwise from the position shown in FIG. 3 to the position shown in FIG. 4, cam finger 104 engages against inner side 73 of clamping member 14 in the plane of axes 86 and 96 to displace the clamping member along post 84 to bring teeth 74 and 76 at the opposite ends of the clamping member into radial engagement with the cable to press the latter against the outer side of passageway 32 and thus preclude displacement of the free end of the cable in either of the opposite directions relative to the passageway. This is the fully locked disposition of the cable lock, and it will be noted that detent ball 110 engages the outer periphery of cam member 100 outwardly adjacent detent recess 106.

Figure 3:
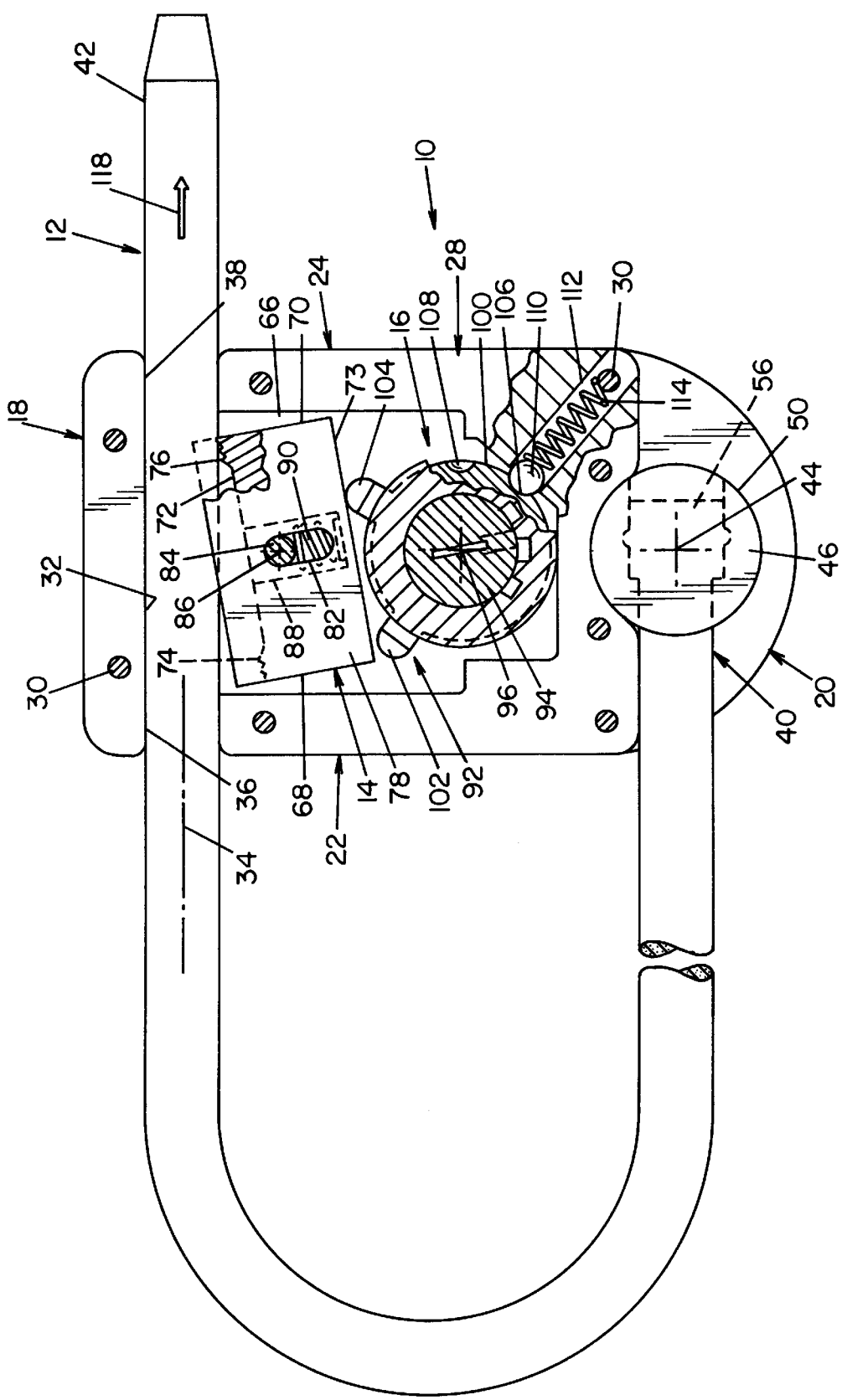
FIG. 3 is a plan view similar to FIG. 1 and showing the cam operated clamping member in the position to allow displacement of the free end of the cable only in the direction from left to right in the cable passageway.

From the foregoing, it will be appreciated that the sequence of assembly of the cable lock relative to an item or items to be captured between the loop of the cable and side 22 of the housing includes displacing the key operated cam assembly to the position shown in FIG. 3, introducing free end 42 of the cable into end 36 of passageway 32 and thence through the passageway to the extent necessary to reduce the size of the loop to that desired by the user and then, preferably, displacing the cam assembly to the position shown in FIG. 4 to engage the cable against displacement in either of the opposite directions relative to passageway 32. With regard to the latter step, it will be appreciated that the free end of the cable in the position shown in FIG. 3 cannot be withdrawn or retracted from passageway 32 and would, therefore, serve to lock the item or items in the cable loop. However, if the user prefers to preclude either an accidental displacement of the cable so as to reduce the size of the loop, or such displacement by a third party whether intentional or unintentional, displacing the component parts to the positions shown in FIGS. 4 and 5 advantageously precludes such displacement. As will be appreciated from FIGS. 1–4, first end 40 of the cable extends toward side 22 of the housing which is the same side as that of entrance end 36 into the passageway. This orientation not only eases introduction of free end 42 into the passageway but also optimizes the use of the cable in forming a loop with side 22 for an item or items to be captured therein. When it is desired to release the cable for displacement from passageway 32, the key operated cam assembly is manipulated to displace cam fingers 102 and 104 from the positions shown in FIG. 4 back to the positions shown in FIG. 1.

Figure 6:
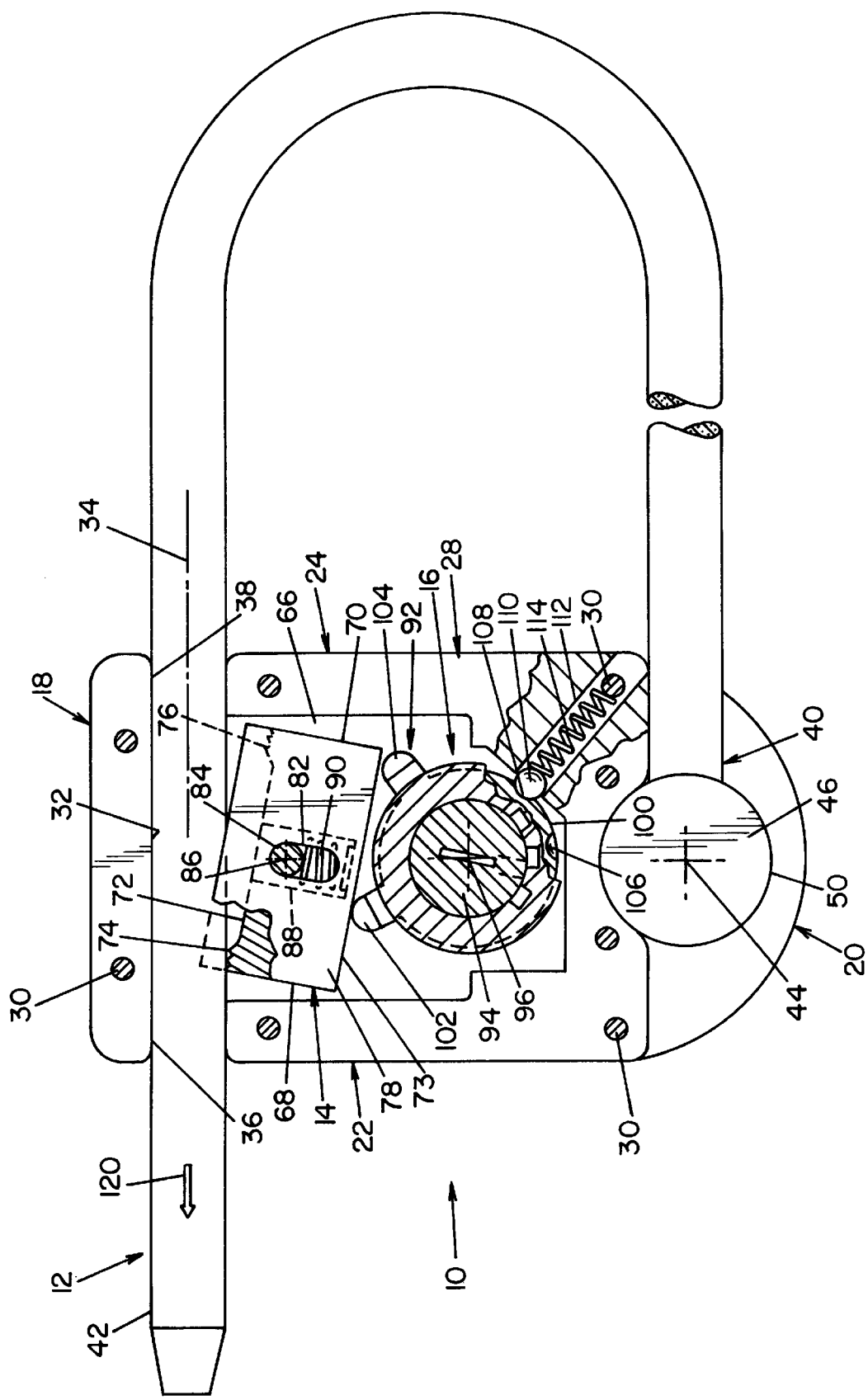
FIG. 6 is a plan view similar to FIG. 1 and showing the cam operated clamping member in the position to enable displacement of the free end of the cable only in the direction from right to left in the passageway; and, FIG. 7 is a plan view similar to FIG. 6 and showing the cam operated clamping member in the position to preclude displacement of the free end of the cable in either direction along the passageways.
Figure 7:
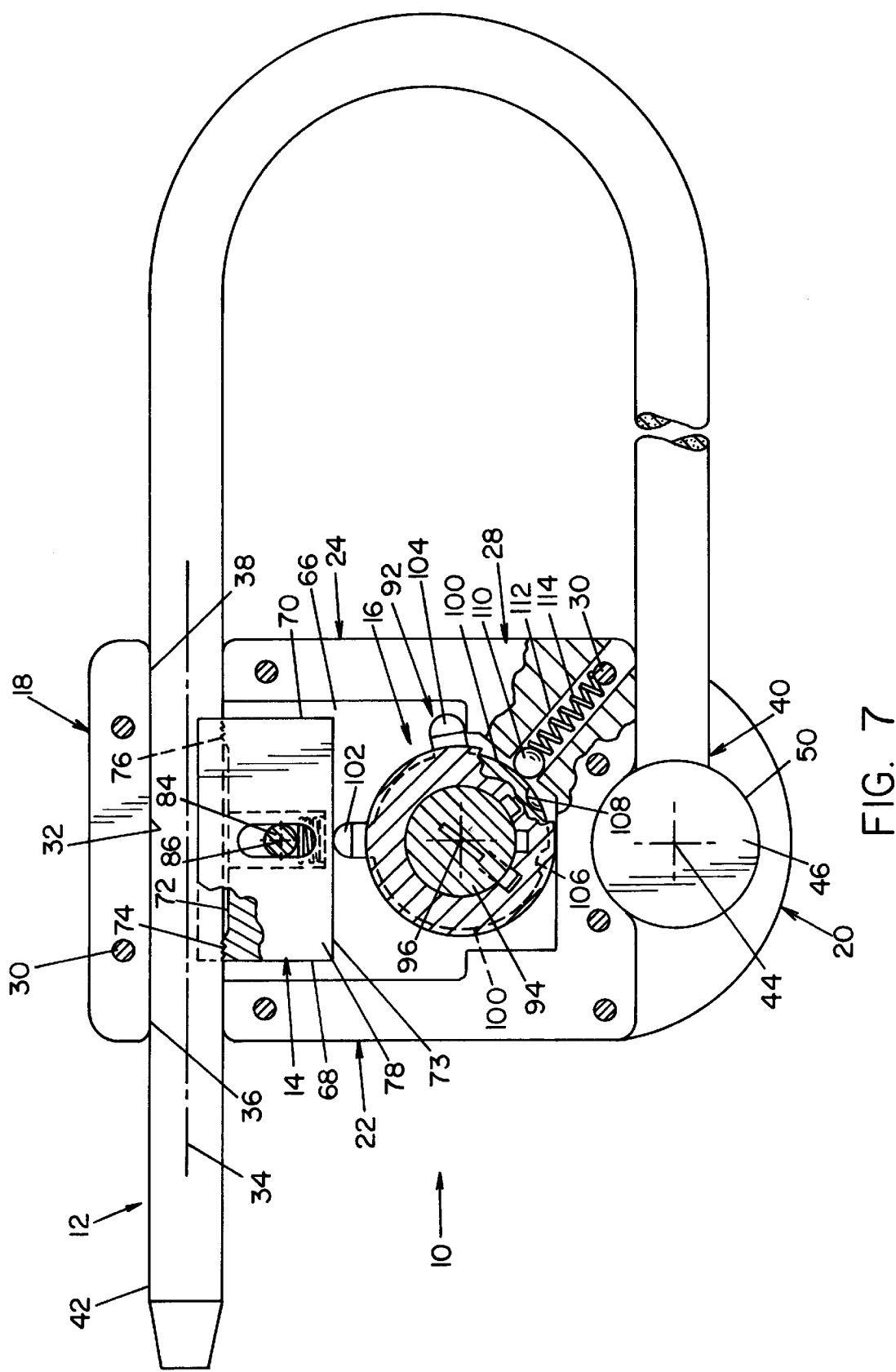

When it is desired to reverse the direction of entry of free end 42 of the cable relative to passageway 32 in the housing, first end 40 of the cable is pivoted counterclockwise about axis 44 from the position shown in FIG. 1 to the position shown in FIG. 6 in which the first end of the cable extends towards the opposite side 24 of the housing from the direction of extension thereof in FIG. 1. As will be appreciated from FIG. 6, such pivotal displacement of end 40 of the cable positions free end 42 thereof on side 24 which is the same side as that of entrance 38 into the passageway and thus, as with the orientation shown in FIGS. 1–4, not only facilitates the ease of introducing the free end into the passageway but also optimizes the use of cable 12 in forming a loop with side 24 of the housing for an item or items to be captured therein. Further in connection with introducing the free end of the cable into end 38 of the passageway, the key operated cam mechanism is manipulated clockwise from the position shown in FIG. 1 whereby cam finger 104 is displaced away from inner end 73 of clamping member 14 and cam finger 102 pivots the clamping member clockwise about pivot axis 86 to position teeth 74 against the cable in passageway 32. Thus, free end 42 of the cable is adapted to be displaced through passageway 32 in the direction of arrow 120 and is restrained by teeth 74 from displacement in the opposite direction or the direction of retraction relative to end 38 of the passageway. In this position of the component parts, detent ball 110 engages in recess 108 in the cam plate to stabilize the cam assembly against unintentional displacement from the position shown during the movement of the free end of the cable into its use position. When the cable is so displaced, the cam mechanism is preferably turned further clockwise from the position shown in FIG. 6 to that shown in FIG. 7 in which cam finger 102 engages against the inner side 73 of clamping member 14 in the plane of axes 86 and 96, thereby displacing both teeth 74 and 76 radially against the cable in passageway 32 to preclude displacement of the free end of the cable in either direction relative to the passageway. Again, when it is desired to release the cable lock, the cam assembly is rotated counterclockwise from the position shown in FIG. 7 back to the position shown in FIG. 1 to release the clamping member for displacement by spring 90 out of engagement with the cable which can then be withdrawn from the passageway.

While considerable emphasis has been placed herein on the structure and structural interrelationship between the component parts of the preferred embodiment, it will be appreciated that other embodiments of the invention can be made and that many changes can be made in the preferred embodiment without parting from the principles of the invention. In this respect in particular, it will be appreciated that, while preferred, it is not necessary to pivotally mount the first end of the cable on the housing in order to attain the benefit of selective entry of the free end of the cable into the opposite ends of the cable passageway through the housing. Moreover, mounting cam provide for pivotal displacement about a pivot axis extending between the front and rear ends of the housing. Further, it will be appreciated that other cam structures and/or cable clamping member structures can be devised for providing the selective operation of the lock to enable displacement of the free end of the cable into and through opposite ends of the passageway in one direction only, against displacement in either direction, and for free displacement in either of the opposite directions. Still further, it will be appreciated that the first end of the cable does not have to be removable from its anchoring post and, if removable, can be interengaged with the post other than by the split ring arrangement shown herein. These and other modifications of the preferred embodiment as well as other embodiments of the invention will be obvious and suggested to those skilled in the art from the disclosure herein, whereby it is to be distinctly understood that the foregoing descriptive matter is to be interpreted merely as illustrative of the present invention and not as a limitation.

Having thus described the invention, it is so claimed:

1. A cable lock comprising a housing, a flexible cable having a free end, a cable passageway through said housing, said cable passageway having opposite ends for selectively receiving said free end for displacement in a first direction from one of said opposite ends toward the other and for displacement in a second direction from the other end toward the one end, and means in said housing for enabling displacement of said free end in said passageway, selectively in a first position where the cable is movable only in the first direction and unable to move in the second direction, a second position where the cable is movable only in the second direction and unable to move in the first direction, or freely movable in both said first and second directions.

2. A cable lock according to claim 1, wherein said means in said housing includes means for selectively precluding displacement of said free end in either of said first and second directions.

3. A cable lock according to claim 1, wherein said housing has opposite sides and said opposite ends of said cable passageway are each on a different one of said sides, a first end of said cable being mounted on said housing for pivotal displacement between first and second positions in which said first end of said cable extends toward a different one of said sides.

4. A cable lock according to claim 3, wherein said cable passageway has an axis and said first end of said cable has an axis parallel to the axis of said cable passageway in each of said first and second positions of said first end.

5. A cable lock according to claim 1, wherein said means in said housing includes cable clamping means having first and second clamping positions relative to said free end for respectively enabling said displacement in said first direction and in said second direction, and detent means for releasably holding said clamping means in each of said first and second clamping positions thereof.

6. A cable lock according to claim 1, wherein said cable passageway has an axis between said opposite ends and said means in said housing includes a cable clamping member having opposite ends in the direction of said opposite ends of said cable passageway, and means supporting said clamping member for reciprocating movement laterally toward and away from said passageway and for pivotal displacement of said opposite ends thereof about a pivot axis transverse to the axis of said cable passageway.

7. A cable lock according to claim 6, further comprising means biasing said clamping member laterally away from said passageway.

8. A cable lock according to claim 6, wherein said means in said housing further includes cam means for reciprocating and pivoting said clamping member.

9. A cable lock according to claim 8, wherein said cam means is key operated.

10. A cable lock according to claim 9, further comprising means biasing said clamping member laterally away from said passageway.

11. A cable lock according to claim 6, wherein said first end of said cable has an axis and is mounted on said housing for pivotal displacement between first and second positions of said first end, in which said first end extends in opposite directions relative to said housing and in each of which positions the axis of said first end is parallel to the axis of said cable passageway.

12. A cable lock according to claim 6, wherein said means in said housing includes means for selectively precluding displacement of said free end in either of said first and second directions.

13. A cable lock according to claim 12, wherein said cable clamping member has first and second clamping positions relative to said free end of said cable for respectively enabling said displacement in said first direction and in said second direction, and detent means for releasably holding said clamping member in each of said first and second clamping positions thereof.

14. A cable lock according to claim 12, wherein said first end of said cable has an axis and is mounted on said housing for pivotal displacement between first and second positions of said first end, in which said first end extends in opposite directions relative to said housing and in each of which positions the axis of said first end is parallel to the axis of said cable passageway.

15. A cable lock according to claim 14, wherein said means in said housing further includes key operated cam means for reciprocating and pivoting said clamping member.

16. A cable lock according to claim 15, further comprising means biasing said clamping member laterally away from said passageway.

17. A cable lock according to claim 16, wherein said cable clamping member has first and second clamping positions relative to said free end of said cable for respectively enabling said displacement in said first direction and in said second direction, and detent means for releasably holding said clamping member in each of said first and second clamping positions thereof.

18. A cable lock comprising a housing, a flexible cable having a first end anchored to said housing and having a free end, a cable passageway through said housing having opposite ends for selectively receiving said free end of said cable, a cable clamping member supported in said housing for displacement between first, second, and third positions relative to said free end of said cable in said cable passageway and in which positions said free end is respectively displaceable only in a first direction from one of said opposite ends to the other wherein the cable is held by the cable clamping member displaceable only in a second direction from the other of the opposite ends toward the one end wherein the cable is held by the cable clamping member or freely displaceable in both said first and second directions, and means for displacing said clamping member between said first, second and third positions.

19. A cable lock according to claim 18, wherein said clamping member is supported for displacement to a fourth position relative to said free end in which said free end is precluded from displacement in either of said first and second directions.

20. A cable lock according to claim 18, wherein said cable passageway has an axis and said clamping member is mounted in said housing for pivotal displacement between said first, second and third positions about a pivot axis laterally spaced from and transverse to the axis of said cable passageway, said clamping member having first and second ends respectively adjacent said other and said one of said opposite ends of said passageway, said first end engaging said cable in said first position of said clamping member, said second end engaging said cable in said second position of said clamping member, and said first and second ends disengaging said cable in said third position.

21. A cable lock according to claim 20, wherein said means for displacing said clamping member includes means for biasing said clamping member toward said third position.

22. A cable lock according to claim 20, wherein said clamping member is reciprocable relative to said pivot axis from said third position to a fourth position in which said first and second ends engage said cable against displacement in both said first and second directions.

23. A cable lock according to claim 22, further comprising a spring biasing said clamping member from said fourth position toward said third position.

24. A cable lock according to claim 18, wherein said housing has opposite sides and said opposite sides of said cable passageway are each on a different one of said sides, said first end of said cable being mounted on said housing for pivotal displacement between first and second positions in which said first end of said cable respectively extends toward a different one of said sides.

25. A cable lock according to claim 24, wherein said housing has front and rear ends, said cable passageway being at said front end and having an axis in the direction between said opposite sides, and said first end of said cable being attached to a plug at said rear end of said housing for pivotal displacement about a plug axis.

26. A cable lock according to claim 25, wherein said first end of said cable is releasably mounted in said plug.

27. A cable lock according to claim 25, wherein said plug axis is transverse to said axis of the cable passageway.

28. A cable lock according to claim 27, wherein said first end of said cable has an axis parallel to said axis of said cable passageway in each of said first and second positions of said first end.

29. A cable lock according to claim 28, wherein said plug axis and the axis of said first end of the cable are in a common plane parallel to said axis of said cable passageway.

30. A cable lock according to claim 29, wherein said plug has a bore therethrough having a bore axis parallel to said axis of said cable passageway axis in each of said first and second positions of said first end of said cable, said first end having a terminal end in said bore, said terminal end and said bore including recess means coaxial with said bore axis, and a split ring in said recess means for releasably retaining said terminal end in said bore.

31. A cable lock according to claim 18, wherein said means for displacing said clamping member includes a key operated cam member supported in said housing for displacement between first, second and third cam positions respectively corresponding to said first, second and third positions of said cable clamping member.

32. A cable lock according to claim 31, wherein said clamping member is supported for displacement to a fourth position relative to said free end in which said free end is precluded from displacement in either of said first and second directions, said cam member being displaceable to a fourth cam position corresponding to said fourth position of said clamping member.

33. A cable lock according to claim 31, and detent means for releasably holding said cam in said first and second cam positions.

34. A cable lock according to claim 31, wherein said cable passageway has an axis and said cam member is pivotal between said first, second and third cam positions about a cam axis laterally spaced from and transverse to said axis of said cable passageway.

35. A cable lock according to claim 34, wherein said cam member includes first and second detent recesses circumferentially spaced apart about said cam axis, and a spring biased detent ball supported on said housing for engaging in said first and second recesses to respectfully releasably hold said cam member in said first and second cam positions.

36. A cable lock according to claim 34, wherein said clamping member is mounted in said housing for pivotal displacement between said first, second and third positions thereof about a pivot axis between said cam axis and said axis of said cable passageway and parallel to said cam axis.

37. A cable lock according to claim 36, wherein said clamping member has first and second ends respectively adjacent said other and said one of said opposite ends of said cable passageway, said first end engaging said cable in said first position of said clamping member, said second end engaging said cable in said second position of said clamping member, and said first and second ends disengaging said cable in said third position.

38. A cable lock according to claim 37, wherein pivoting said cam member to said first and second cam positions respectively pivots said clamping member about said pivot axis to said first and second positions thereof.

39. A cable lock according to claim 38, wherein said cam member includes a pair of circumferentially spaced apart cam fingers, one of said fingers in moving to said first cam position engaging and pivoting said clamping member about said pivot axis to said first position thereof, the other of said fingers in moving to said second cam position engaging and pivoting said clamping member to said second position thereof, and said pair of fingers in said third cam position engaging and supporting said clamping member in said third position thereof.

40. A cable lock according to claim 39, wherein said means for displacing said clamping member includes a spring biasing said clamping member against said pair of fingers in said third position thereof.

41. A cable lock according to claim 39, wherein said clamping member is reciprocable relative to said pivot axis from said third position to a fourth position in which said first and second ends engage said cable against displacement in both said first and second directions, said cam being pivotal about said cam axis to selectively position each of said cam fingers in a fourth position engaging said clamping member in said fourth position thereof.

42. A cable lock according to claim 41, wherein said means for displacing said clamping member includes a spring biasing said clamping member against said pair of fingers in said third position thereof.

43. A cable lock according to claim 42, wherein said housing has opposite sides and said opposite ends of said cable passageway are each on a different one of said sides, said first end of said cable being mounted on said housing for pivotal displacement between first and second positions in which said first end of said cable respectively extends toward a different one of said sides, said housing having front and rear ends, said cable passageway being at said front end and having an axis in the direction between said opposite sides, and said first end of said cable being attached to a plug at said rear end of said housing for pivotal displacement about a plug axis.

44. A cable lock according to claim 43, wherein said plug axis is transverse to said axis of said cable passageway and said first end of said cable has an axis parallel to said axis of said cable passageway in each of said first and second positions of said first end.

45. A cable lock according to claim 44, wherein said plug has a bore therethrough having a bore axis parallel to said axis of said cable passageway in each of said first and second positions of said first end of said cable, said first end having a terminal end in said bore, said terminal end and said bore including recess means coaxial with said bore axis, and a split ring in said recess means for releasably retaining said terminal end in said bore.

46. A cable lock according to claim 45, wherein said cam member includes first and second detent recesses circumferentially spaced apart about said cam axis, and a spring biased detent ball supported on said housing for engaging in said first and second recesses to respectfully releasably hold said cam member in said first and second cam positions.

* * * * *

UNITED STATES PATENT AND TRADEMARK OFFICE
CERTIFICATE OF CORRECTION

PATENT NO.     : 6,609,399 B1
DATED          : August 26, 2003
INVENTOR(S)    : E. Kent Daniels, Jr.

It is certified that error appears in the above-identified patent and that said Letters Patent is hereby corrected as shown below:

<u>Column 10,</u>
Line 39, delete "axis" (second occurrence).

Signed and Sealed this

Sixteenth Day of December, 2003

JAMES E. ROGAN
*Director of the United States Patent and Trademark Office*